(12) United States Patent
Matsuo et al.

(10) Patent No.: US 7,870,805 B2
(45) Date of Patent: Jan. 18, 2011

(54) RACK-AND-PINION STEERING APPARATUS

(75) Inventors: Tsuyoshi Matsuo, Saitama (JP); Yasuo Shimizu, Saitama (JP); Katsuji Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/287,272

(22) Filed: Oct. 7, 2008

(65) Prior Publication Data

US 2009/0107271 A1    Apr. 30, 2009

(30) Foreign Application Priority Data

Oct. 17, 2007    (JP) ............... 2007-269670

(51) Int. Cl.
*F16H 1/04* (2006.01)
*F16H 35/00* (2006.01)

(52) U.S. Cl. ..................... 74/422; 74/388 PS
(58) Field of Classification Search ............. 74/388 PS, 74/396, 409, 422, 498; 180/428; 280/93.514, 280/93.515
See application file for complete search history.

(56) References Cited

U.S. PATENT DOCUMENTS 6,357,314 B1 * 3/2002 Sommer ................. 74/388 PS
2003/0193154 A1 * 10/2003 Yang ..................... 280/93.514

FOREIGN PATENT DOCUMENTS

| DE | 1 605 911 A1 | 7/1970 |
|---|---|---|
| DE | 197 49 274 C1 | 4/1999 |
| EP | 1 084 933 A1 | 3/2001 |
| FR | 2-122-892 A | 9/1972 |
| FR | 2857425 A1 * | 1/2005 |
| JP | 59-79465 | 5/1984 |
| JP | 2005-247079 | 9/2005 |
| JP | 2006-282058 | 10/2006 |

* cited by examiner

*Primary Examiner*—Thomas R Hannon
*Assistant Examiner*—Phillip A Johnson
(74) *Attorney, Agent, or Firm*—Carrier, Blackman & Associates PC.; William D. Blackman; Joseph P. Carrier

(57) ABSTRACT

A rack-and-pinion steering apparatus in which a steering gear box for transmitting an operation of a steering wheel to road wheels includes a pinion operatively connected to the steering wheel, a rack bar which has a rack meshing with the pinion, and which is operatively connected to the road wheels, a housing slidably supporting the rack bar, a cylindrical rack guide slidably fitted into a guide hole formed in the housing, and a spring member causing the rack guide to abut on a rear part of the rack bar opposite to the rack by biasing the rack guide. A reaction force, which the rack guide receives from the rack bar, acts on the rack guide in such a way as to cause a rotational moment of the rack guide about an axis different from an axis of the rack guide.

13 Claims, 12 Drawing Sheets

PRIOR ART

U.S. 7,870,805 B2

RACK-AND-PINION STEERING APPARATUS

CROSS-REFERENCE TO RELATED APPLICATIONS

The present invention claims priority under 35 USC §119 based on Japanese patent application No. 2007-269670 filed 17 Oct. 2007. The subject matter of this priority document is incorporated by reference herein.

BACKGROUND OF THE INVENTION

1. Field of the Invention

The present invention relates to a rack-and-pinion steering apparatus in which a steering gear box for transmitting an operation of a steering wheel to road wheels includes: a pinion operatively connected to the steering wheel; a rack bar which has a rack meshing with the pinion, and which is connected to the wheels; a housing for slidably supporting the rack bar; a cylindrical rack guide slidably fitted into a guide hole formed in the housing; and a spring member for causing the rack guide to abut on a rear of the rack bar by biasing the rack guide.

2. Description of the Related Art

A known rack-and-pinion steering apparatus is shown in Japanese Patent Application Laid-open No. 2005-247079.

FIG. 12 shows a conventional-type rack-and-pinion steering apparatus. A pinion 02 provided to a pinion shaft 01 meshes with a rack 04 provided on a rack bar 03. A cylindrical rack guide 07 slidably fitted into a guide hole 06 in a housing 05 is biased by a spring 08 in such a way as to abut on the rear of the rack bar 03, and thus restricts the deformation of the rack 04. This secures an appropriate meshing of the rack 04 with the pinion 02, and also prevents the rack bar 03 from bending due to a meshing reaction force.

A biasing force F1 from the spring 08 and a reaction force F2 from the rack bar 03 both act on the rack guide 07. Both a line of action of the biasing force F1 and a line of action of the reaction force F2 exist on the axis Lg of the rack guide 07. For this reason, looseness existing between the rack guide 07 and the guide hole 06 allows the rack guide 07 to vibrate. The vibration brings about a problem of causing noise.

SUMMARY OF THE INVENTION

Accordingly, the present invention has been made in view of the above known problems. An object of the present invention is to prevent noise from occurring due to the looseness of the rack guide fitted into the guide hole in the rack-and-pinion steering apparatus.

In order to achieve the object, according to a first feature and aspect of the present invention, there is provided a rack-and-pinion steering apparatus in which a steering gear box for transmitting an operation of a steering wheel to road wheels includes: a pinion operatively connected to the steering wheel; a rack bar which has a rack meshing with the pinion, and which is operatively connected to the road wheels; a housing slidably supporting the rack bar; a cylindrical rack guide slidably fitted into a guide hole formed in the housing; and a spring member for causing the rack guide to abut on a rear part of the rack bar opposite to the rack by biasing the rack guide, wherein a reaction force which the rack guide receives from the rack bar acts on the rack guide in such a way as to cause a rotational moment about an axis different from an axis of the rack guide.

The configuration according to the first feature and aspect of the present invention causes the spring member to bias the cylindrical rack guide slidably fitted into the guide hole in the housing, and thus causes the rack guide to abut the rear part of the rack bar, while a steering torque acts on a part of the rack bar where the rack meshes with the pinion in such a way as to move the rack bar away from the pinion. Thereby, the meshing of the rack with the pinion can be kept in an appropriate condition. Particularly, the reaction force which the rack guide receives from the rack bar acts on the rack guide in such a way as to cause the rotation moment about the axis different from the axis of the rack guide. This makes the rack guide partially abut the guide hole, so that the rack guide and the guide hole are partially in tight contact with each other. Thereby, any looseness of the rack guide can be prevented, and vibration noise due to the looseness can thus be prevented.

According to a second feature and aspect of the present invention, in addition to the first feature and aspect of the present invention, a line of action of the reaction force is in parallel with the axis of the rack guide, and is eccentric to the axis of the rack guide.

The configuration to the second feature and aspect of the present invention makes the line of action of the reaction force, which the rack guide receives from the rack bar, to be parallel with the axis of the rack guide, and concurrently eccentric to the axis of the rack guide. For this reason, a rotational moment about the axis, which is different from the axis of the rack guide, can be generated to act on the rack guide.

According to a third feature and aspect of the present invention, in addition to the second feature and aspect of the present invention, the reaction force also causes a rotational moment which rotates the rack guide about the line of action of the reaction force.

The configuration according to the third feature and aspect of the present invention makes the reaction force, which the rack guide receives from the rack bar, cause the rotational moment which rotates the rack guide about the line of action of the reaction force. Thereby, this rotational moment causes the rack guide to partially abut the guide hole. As a result, the rotational moment based on the configuration according to the second aspect and feature of the present invention and the rotational moment about the line of action of the reaction force are generated simultaneously. Accordingly, vibration and noise due to the looseness can be prevented more reliably.

According to a fourth feature and aspect of the present invention, in addition to the third feature and aspect of the present invention, a pressure surface of the rack guide, which has an arc-shaped cross-section and with which the rack guide presses the rear of the rack bar, has an upper notch formed in its upper edge and a lower notch formed in its lower edge, the upper notch having a larger width at one end side of the rack bar and a smaller width at another end side thereof, and the lower notch having a smaller width at the one end side of the rack bar and a larger width at the other end side thereof.

With the configuration according to the fourth feature and aspect of the present invention, the pressure surface of the rack guide, having an arc-shaped cross-section, includes an upper notch in its upper edge and a lower notch in its lower edge. The upper and lower notches are displaced in the same direction as that in which the axis of the rack bar extends. The upper and lower notches put the reaction forces, which the upper and lower edges of the pressure surface receive from the rear of the rack bar, out of balance. Thereby, a rotational moment can be generated about the line of action of the reaction force.

According to a fifth feature and aspect of the present invention, in addition to the first feature and aspect of the present invention, a line of action of the reaction force extends non-parallel with the axis of the rack guide.

The configuration according to the fifth feature and aspect of the present invention makes the line of action of the reaction force, which the rack guide receives from the rack bar, non-parallel with the axis of the rack guide. For this reason, a rotational moment about an axis, which is different from the axis of the rack guide, can be generated to act on the rack guide.

According to a sixth feature and aspect of the present invention, in addition to the fifth feature and aspect of the present invention, an angle between an axis of the pinion and the axis of the rack guide is other than 90°.

The configuration according to the sixth feature and aspect of the present invention makes the angle between the axis of the pinion and the axis of the rack guide other than 90°. For this reason, the line of action of the reaction force, which the rack guide receives from the rack bar, can be made non-parallel with the axis of the rack guide.

According to a seventh feature and aspect of the present invention, in addition to the first feature and aspect of the present invention, a plurality of contact lines, extending in parallel with an axis of the rack bar, protrude from a pressure surface of the rack guide, the rack guide pressing the rear part of the rack bar with the pressure surface, and the contact lines abut on the rear part of the rack bar.

The configuration according to the seventh aspect and feature of the present invention causes a plurality of raised contact lines, integrally formed and extending in parallel with the axis of the rack bar, to protrude from the pressure surface of the rack guide, and thus makes these contact lines abut on the rear part of the rack bar. For this reason, resistance, which occurs when the rack guide and the rack bar slide on each other, can be reduced.

The above description, other objects, characteristics and advantages of the present invention will be clear from detailed descriptions which will be provided for the preferred embodiments referring to the attached drawings.

BRIEF DESCRIPTION OF THE DRAWINGS

FIG. 1 is an overall perspective view of an electric power steering apparatus according to the first exemplary embodiment of the present invention.

FIG. 2 is an enlarged, cross-sectional view taken along a line 2-2 in FIG. 1.

FIG. 3 is an enlarged view of a lower part of FIG. 2 indicated by reference numeral 3.

FIG. 4 is a perspective view of a rack guide and a rack bar, according to a first exemplary embodiment of the present invention.

FIG. 5 is a view from a direction of an arrow 5 in FIG. 4.

FIG. 6 is a perspective view of a rack guide and a rack bar according to a second exemplary embodiment of the present invention.

FIG. 7 is a view from a direction of an arrow 7 in FIG. 6.

FIG. 9 is an enlarged view of a lower part of FIG. 2, indicated by reference numeral 3, according to a fourth exemplary embodiment.

FIG. 10 is a perspective view of a rack guide and a rack bar according to a fourth exemplary embodiment of the present invention.

DESCRIPTION OF THE PRESENT EMBODIMENTS

A first exemplary embodiment of the present invention will be described based on FIGS. 1 to 5.

Figure 1:
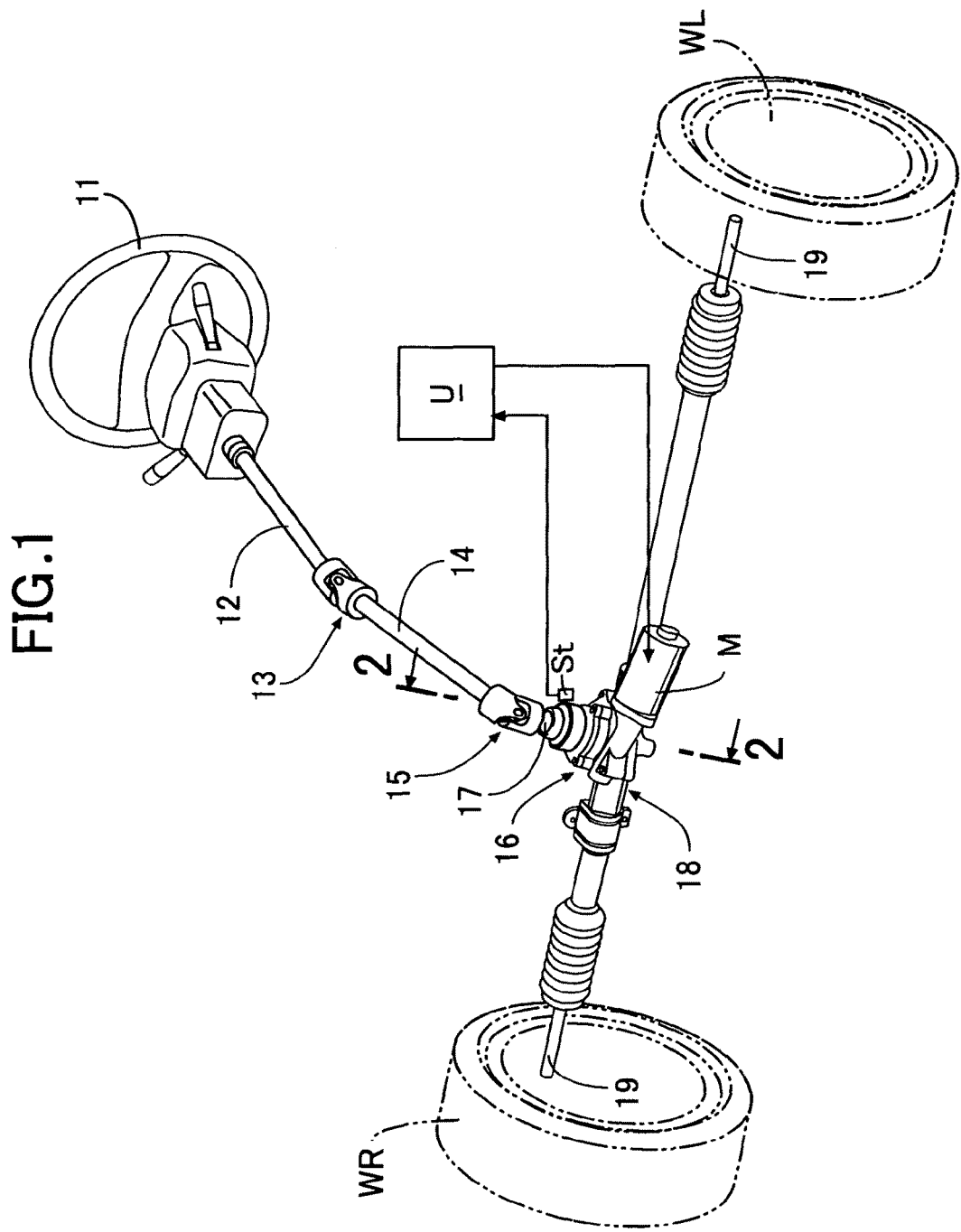
FIGS. 1 to 5 show a first exemplary embodiment according to the present invention.

As shown in FIG. 1, an upper steering shaft 12 designed to rotate together with a steering wheel 11 is connected to a pinion shaft 17 protruding from a decelerator 16 via an upper universal joint 13, a lower steering shaft 14 and a lower universal joint 15. Tie rods 19, 19 protruding from left and right ends of a steering gear box 18 connected to the bottom tip of the decelerator or reduction gear 16 are connected to unillustrated knuckles of the left and right wheels WL, WR. An assist motor M configured of a brushless motor is supported by the decelerator 16. The operation of this assist motor M is controlled by an electronic control unit U into which a signal is inputted from steering torque detecting device St housed in the decelerator 16.

Figure 2:
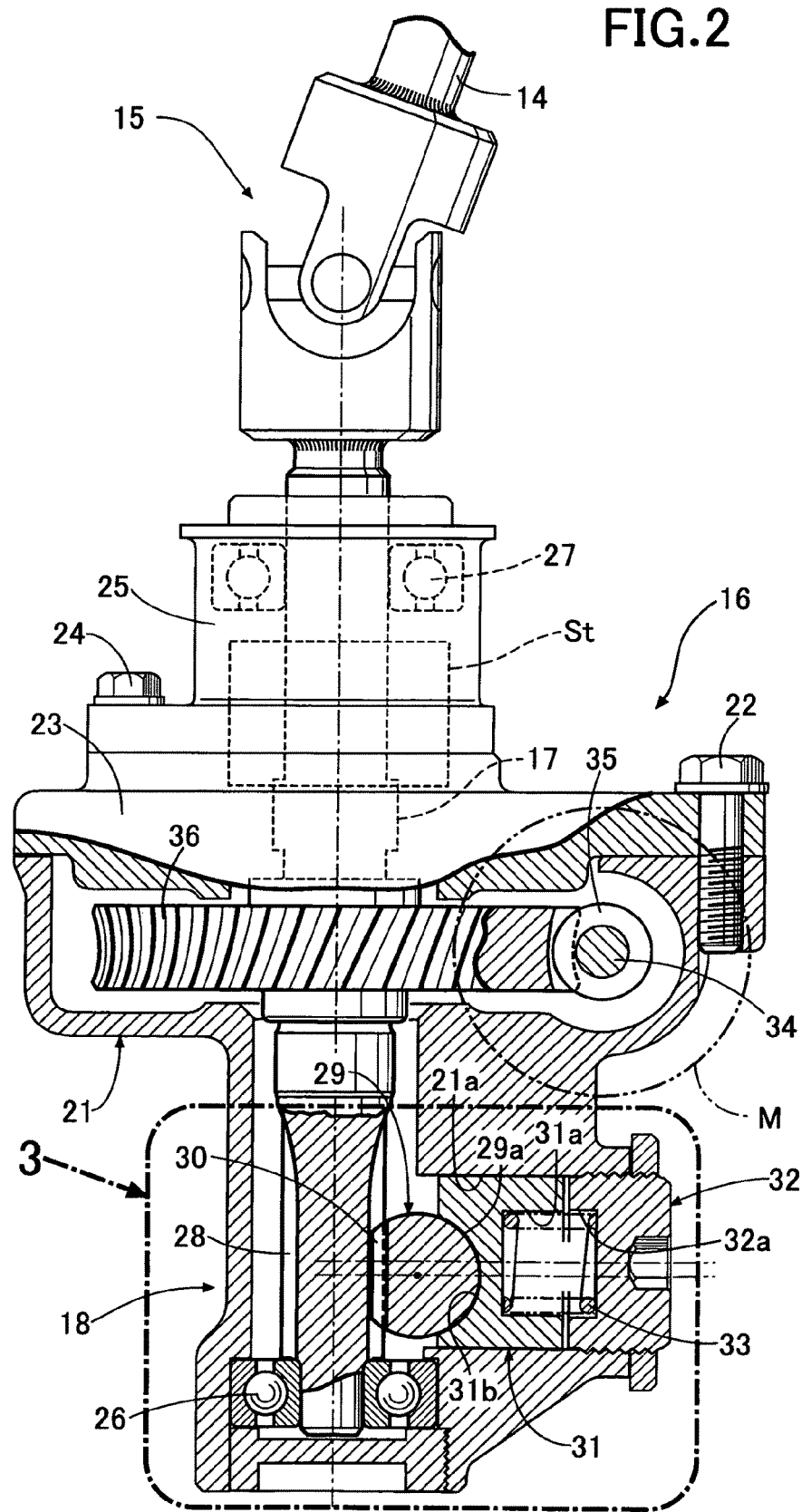

As shown in FIG. 2, the decelerator 16 includes: a lower housing 21 integrated with the steering gear box 18; an intermediate housing 23 connected to the top surface of the lower housing 21 with bolts 22; and an upper housing 25 connected to the top surface of the intermediate housing 23 with bolts 24. The pinion shaft 17 is rotatably supported by the lower housing 21 with a ball bearing 26 being interposed in between, and is rotatably supported by the upper housing 25 with a ball bearing 27 being interposed in between. A pinion 28 provided to the bottom tip of the pinion shaft 17 meshes with a rack 30 provided to a rack bar 29 which travels leftward and rightward inside the steering gear box 18. A substantially cylindrical rack guide 31 is slidably contained in a guide hole 21a with a circular cross-section which is formed in the lower housing 21 constituting a part of the steering gear box 18. The rack guide 31 is biased toward a rear 29a of the rack bar 29 by use of a spring 33 arranged between a concave part 31a formed in the rack guide 31 and a concave part 32a formed in a nut member 32 for closing the guide hole 21a. This makes it possible to restrain the bend of the rack bar 29, and thus to cause the rack 30 to mesh with the pinion 28 tightly. The rack guide 31 and the spring 33 are arranged in a way that their axes coincide with each other, that is to say, in a way that their axes are coaxial with each other.

A worm 35 provided to a rotary shaft 34 of the assist motor M, which extends into the inside of the decelerator 16, meshes with a worm wheel 36 fixed to the pinion shaft 17. For this reason, once the assist motor M is driven, the pinion shaft 17 of the decelerator 16 rotates via the worm wheel 36 meshing with the worm 35 provided to the rotary shaft 34 of the assist motor M, and thus the rack 30 meshing with the pinion 28 is driven. Thereby, the steering torque which a driver applies to the steering wheel 11 is assisted by the assist motor M.

Figure 3:
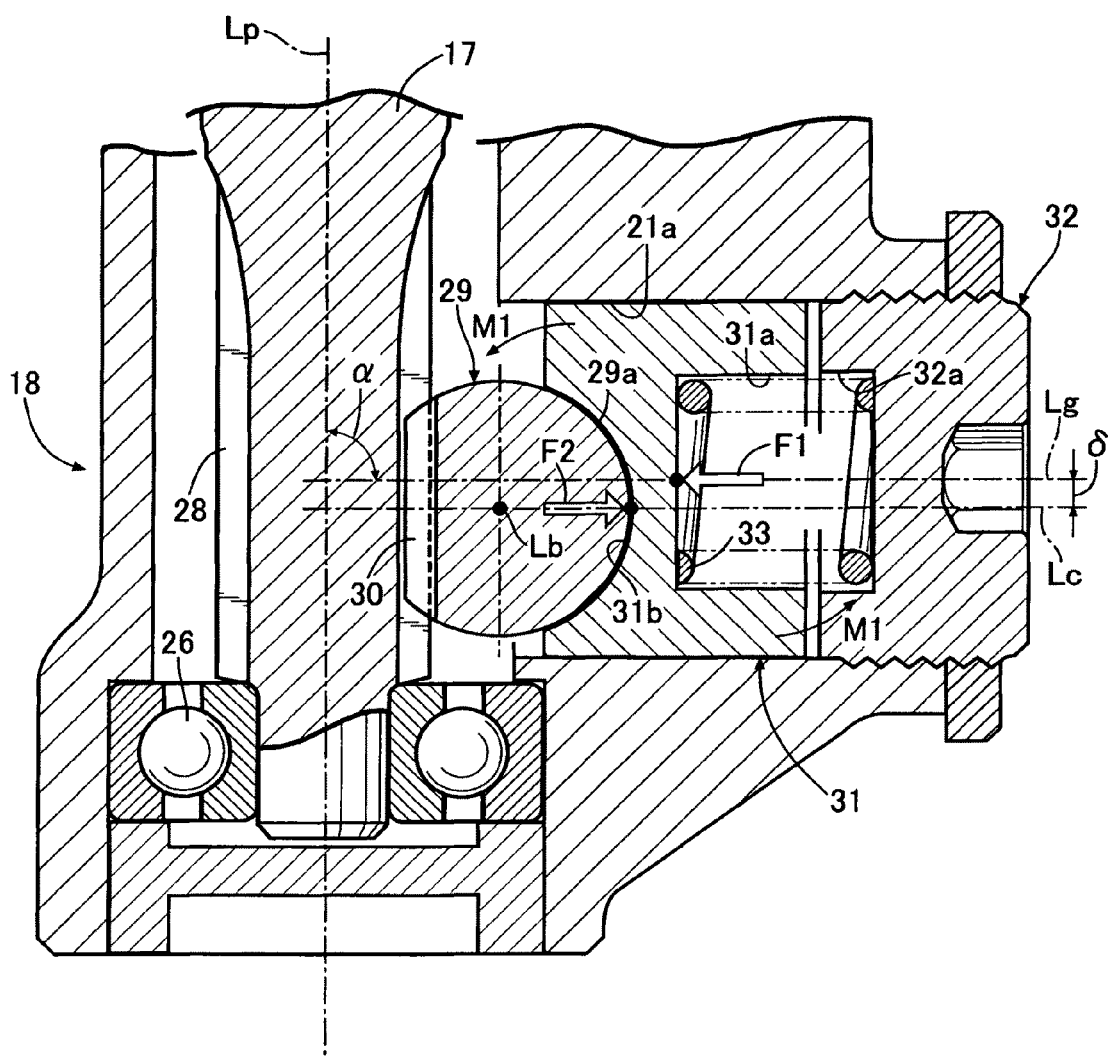
Figure 4:
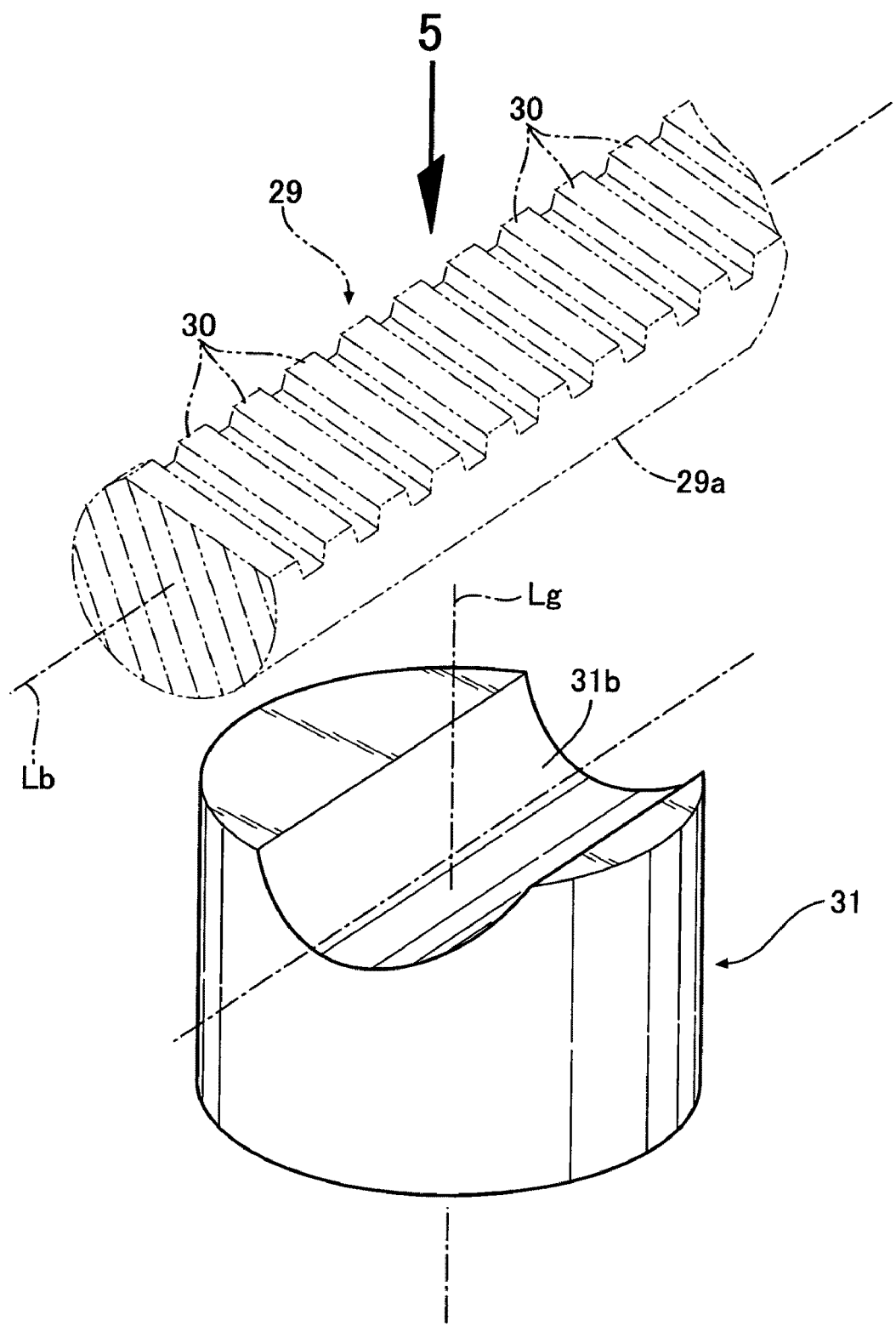
Figure 5:
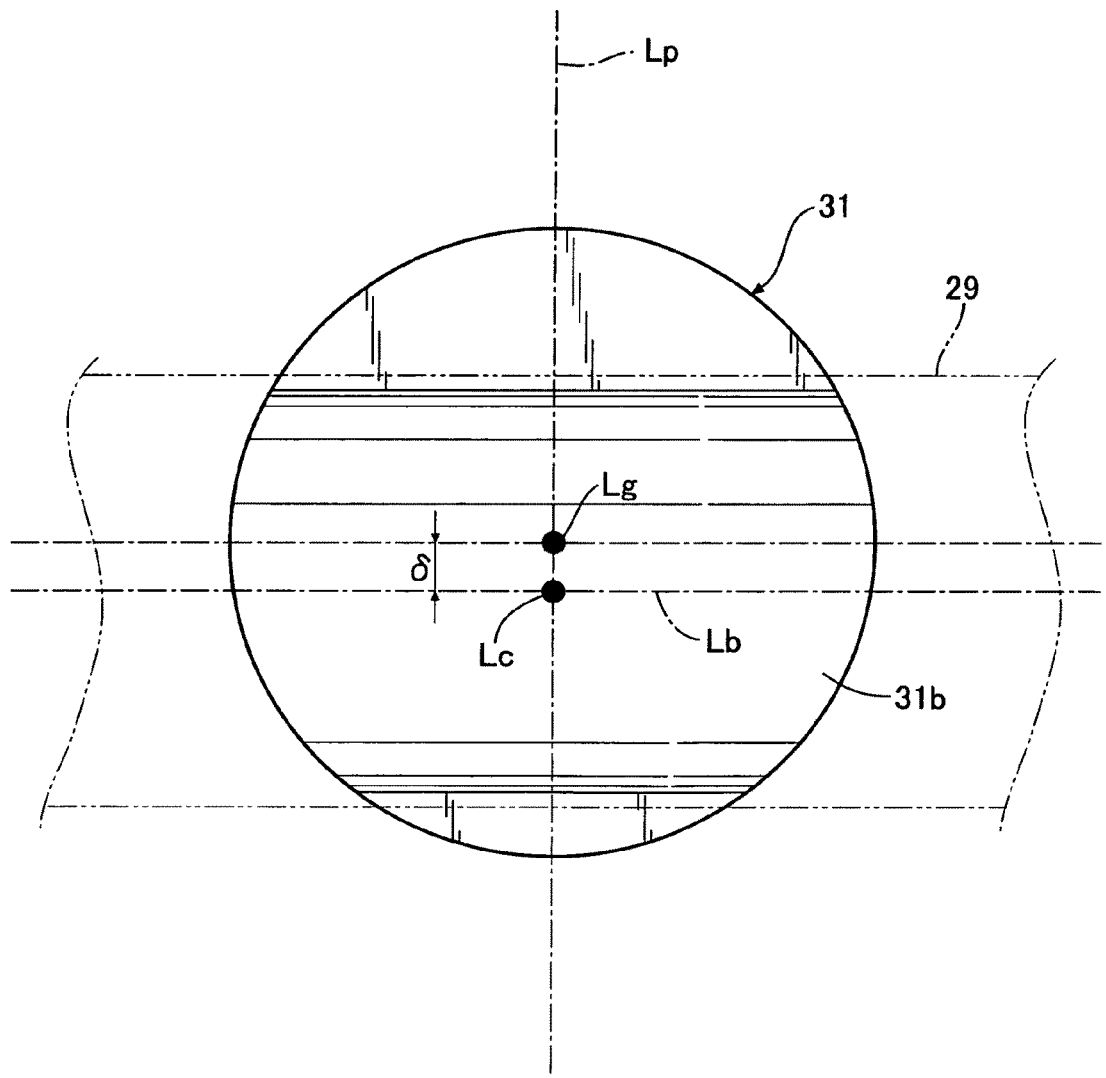

As shown in FIG. 3, the rack bar 29 is basically a cylindrical member except for a front part where the rack 30 is formed. A pressure surface 31b of the rack guide 31, which surface has an arc-shaped cross-section, slidably abuts on a rear part 29a of the cylindrical rack bar, opposite to the front part where the rack is formed.

An axis Lp of the pinion 28 and an axis Lg of the rack guide 31 exist on a common plane (that is, the plane of the paper in FIG. 3), and are orthogonal to each other ($\alpha=90°$). An axis Lb of the rack bar 29 is orthogonal to the axis Lp of the pinion 28 and the axis Lg of the rack guide 31 (or is orthogonal to the plane of the paper in FIG. 3). The center position of the pressure surface 31b of the rack guide 31 does not exist on the axis Lg of the rack guide 31, but is moved from the axis Lg upward or downward (downward is shown in FIG. 3) by a distance $\delta$. In other words, the axis Lg of the rack guide 31 is moved upward from the axis Lb of the rack bar 29 by the distance $\delta$.

Next, descriptions will be provided for how the first exemplary embodiment of the present invention including the foregoing configuration operates.

Once the driver operates the steering wheel 11, the steering torque is transmitted to the rack 30 via the upper steering shaft 12, the upper universal joint 13, the lower steering shaft 14, the lower universal joint 15, the pinion shaft 17 and the pinion 28. The steering torque thus transmitted drives the rack bar 29 leftward or rightward inside the steering gear box 18. At this time, if the assist motor M operates, the assist torque is transmitted to the pinion shaft 17 via the worm 34 and the worm wheel 36, and thus assists the steering operation of the driver.

When a meshing reaction force from the pinion 28 acts on the rack 30, the rack bar 29 is biased in a direction in which the rack bar 29 moves away from the pinion 28. However, the pressure surface 31b of the rack guide 31, biased by the spring 33, abuts on the rear part 29a of the rack bar 29. This abutment prevents the rack bar 29 from bending, and thus keeps the meshing of the rack 30 with the pinion 28 in an appropriate tight condition. While the rack bar 29 moves leftward or rightward, the rear part 29a of the rack bar 29 slides on the pressure surface 31b of the rack guide 31.

As shown in FIG. 3, the line of action of a biasing force F1, with which the spring 33 biases the rack guide 31 toward the rack bar 29, exists on the axis Lg of the rack guide 31. In addition, the line-of-action Lc of a reaction force F2, which the rack guide 31 receives from the rack bar 29, passes through the axis Lb of the rack bar 29, and is parallel with the axis Lg of the rack guide 31. That is because the rear part 29a of the rack bar 29 and the pressure surface 31b of the rack guide 31 evenly abut each other.

Because, as described above, the line of action of the biasing force F1, with which the rack guide 31 biases the rack bar 29 (the axis Lg of the rack guide 31), is in parallel with, and is displaced by the distance $\delta$ from, the line-of-action Lc of the reaction force F2, which the rack guide 31 receives from the rack bar 29, a rotational moment M1 acts on the rack guide 31. This rotational moment M1 acts on the rack guide 31 so as to slightly wrench the rack guide 31 inside the guide hole 21a in the lower housing 21. This action eliminates the looseness of the rack guide 31 in the guide hole 21a, so that vibration of the rack guide 31 and noise due to vibration can be prevented.

When the reaction force F2, which the rack guide 31 receives from the rack bar 29, causes a rotational moment about the axis Lg of the rack guide 31, the rack guide 31 does nothing but rotate inside the guide hole 21, and is incapable of preventing its own looseness at all. By contrast, in the present invention, a reaction force F2 causes a rotation moment about the axis different from the axis Lg of the rack guide 31. Accordingly, the looseness can be eliminated by making the rack guide 31 partially abut on the guide hole 21a.

Figure 6:
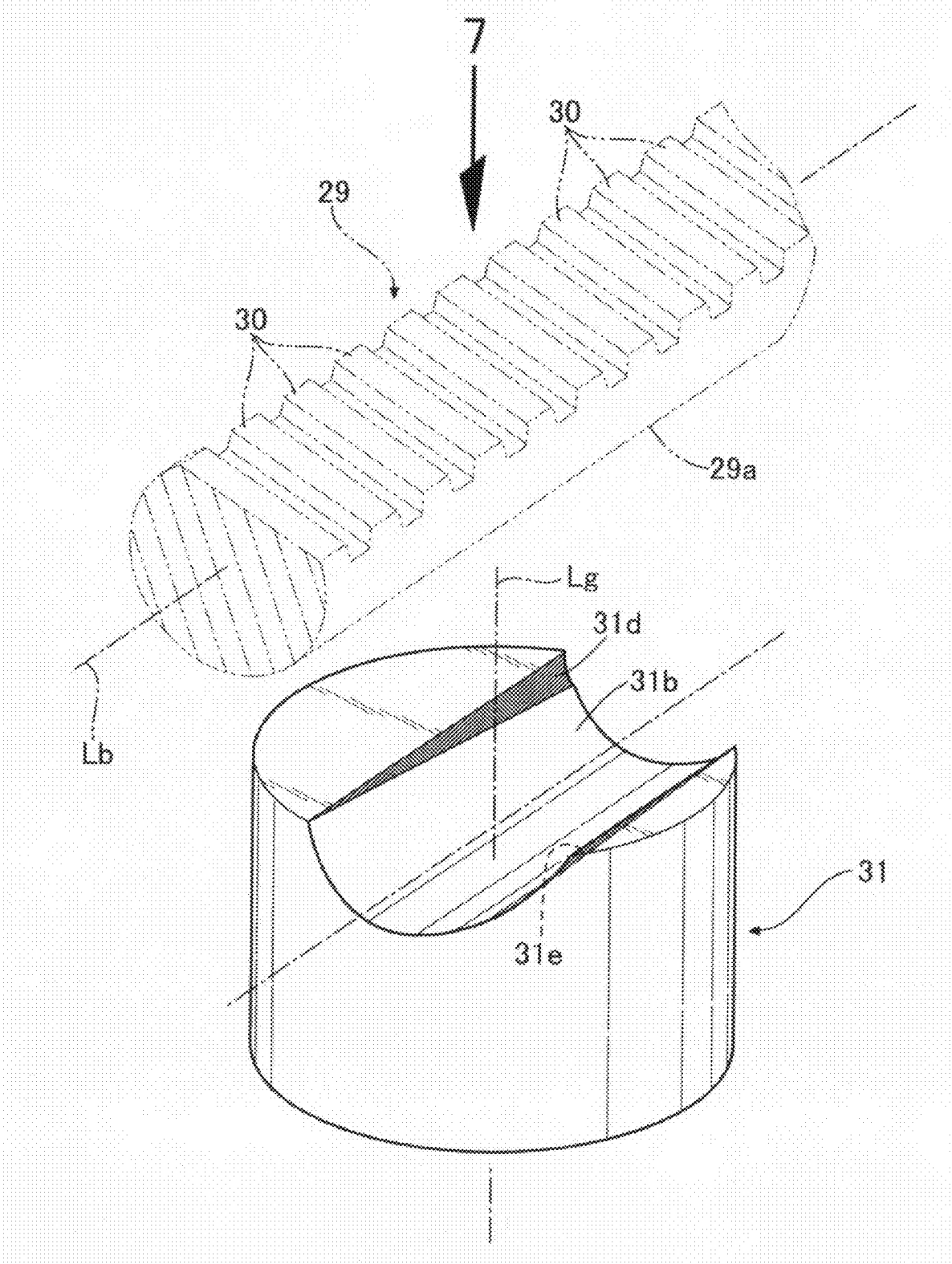
FIGS. 6 and 7 show a second exemplary embodiment according to the present invention.
Figure 7:
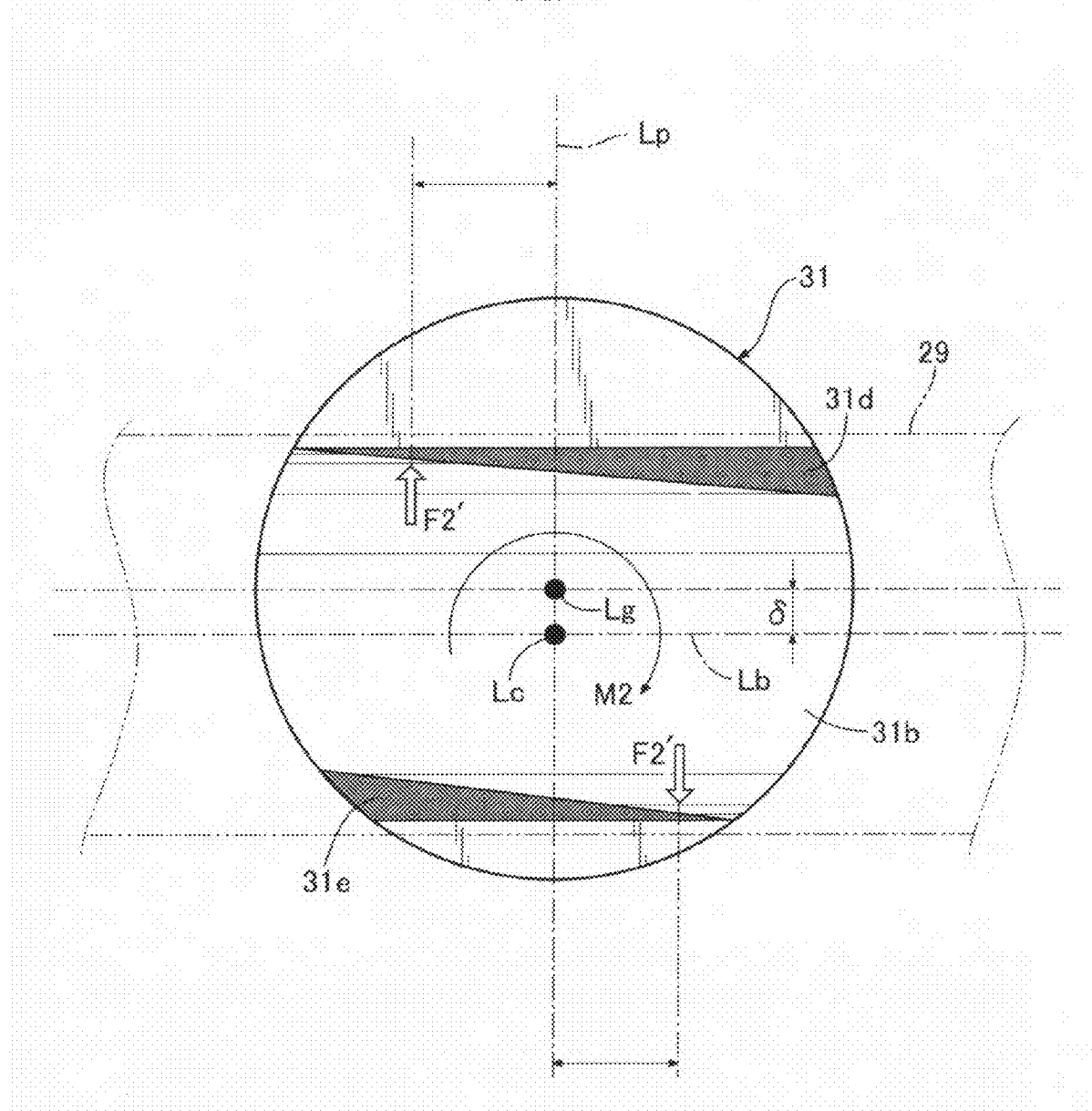

Next, a second exemplary embodiment of the present invention will be described with reference to FIGS. 6 and 7.

The second exemplary embodiment is a further improvement of the first exemplary embodiment. In the second embodiment, an upper notch 31d is formed in an upper edge of the pressure surface 31b of the rack guide 31, and a lower notch 31e is formed in a lower edge of the pressure surface 31b of the rack guide 31. The upper notch 31d becomes progressively wider toward a first-end side of the rack bar 29, and becomes progressively narrower toward a second-end side of the rack bar 29. The lower notch 31e becomes progressively narrower toward the first-end side of the rack bar 29, and becomes progressively wider toward the second-end side of the rack bar 29.

Because the pressure surface 31b is arc-shaped, the reaction force F2 which the pressure surface 31b receives from the rack bar 29 has component forces F2', F2' on a plane orthogonal to the axis Lc (the line of action of the reaction force F2) passing through the center of the pressure surface 31b. These component forces F2', F2' cause a rotational moment M2 about the axis Lc passing through the center of the pressure surface 31b, that is, about the line-of-action Lc of the reaction force F2. If the rotational moment M2 should occur about the axis Lg of the rack guide 31, the rack guide 31 would only turn inside the guide hole 21a, but no wrenching force would occur.

Actually, the axis Lc passing through the center of the pressure surface 31b is eccentric to the axis Lg of the rack guide 31 by the distance $\delta$. For this reason, the rotational moment M2 about the axis Lc wrenches the rack guide 31 inside the guide hole 21a. Cooperation between the wrenching from the rotational moment M1 and the wrenching from the rotational moment M2 can eliminate the looseness of the rack guide 31 in the guide hole 21a, such that the noise can be prevented more securely.

Figure 8:
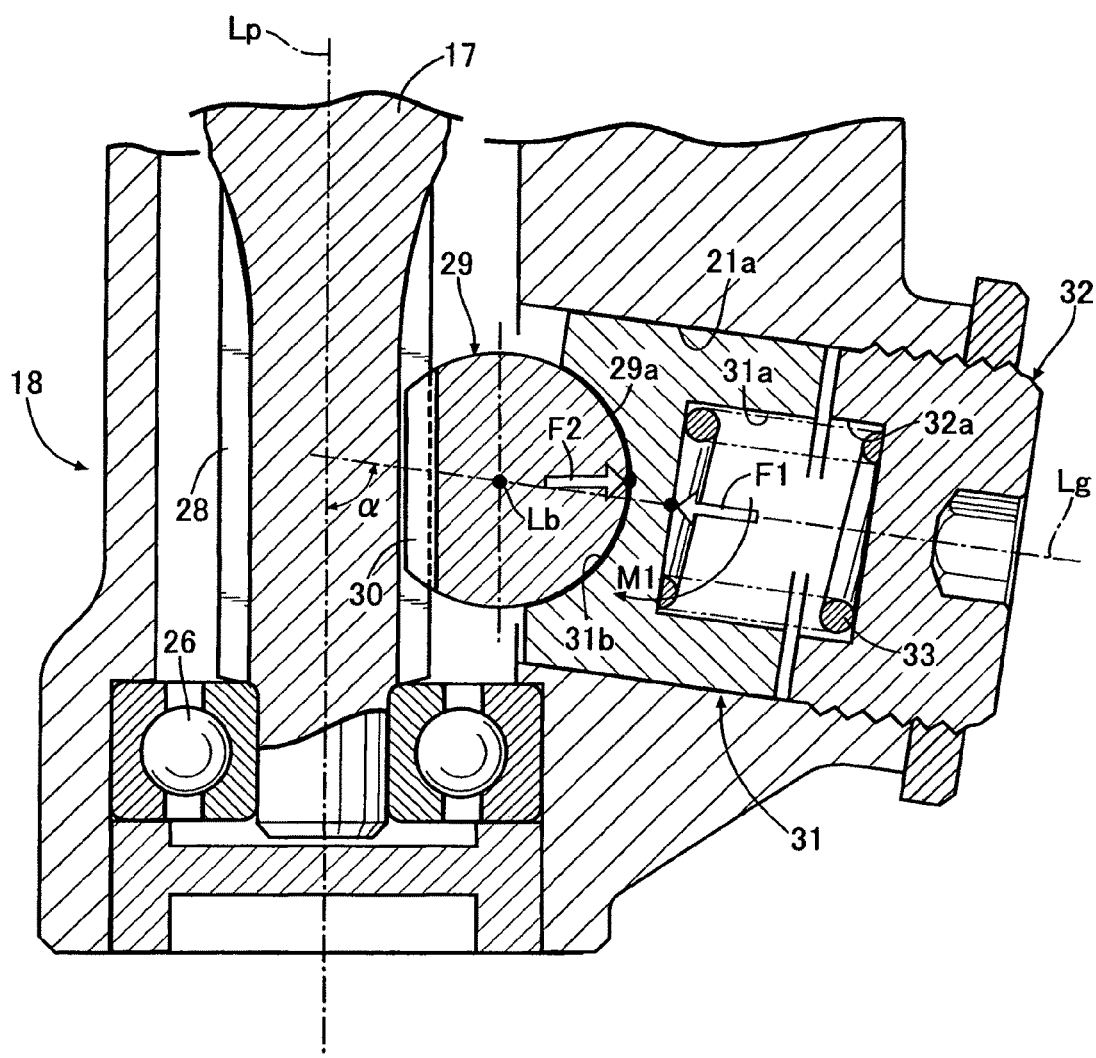
FIG. 8 is an enlarged view of a lower part of FIG. 2, indicated by reference numeral 3, according to a third exemplary embodiment.

Next, a third exemplary embodiment of the present invention will be described with reference to FIG. 8.

In the third exemplary embodiment, the angle $\alpha$ between the axis Lg of the rack guide 31 and the axis Lp of the pinion 28 is set at an acute angle instead of 90°. The pressure surface 31b of the rack guide 31 is disposed symmetrically relative to the axis Lg of the rack guide 31.

The line of action of the biasing force F1 with which the rack guide 31 biases the rack bar 29 (the axis Lg of the rack guide 31) is not in parallel with the line-of-action Lc of the reaction force F2 which the rack guide 31 receives from the rack bar 29. For this reason, the rotational moment M1 acts on the rack guide 31 so as to wrench the rack guide 31 inside the guide hole 21a in the lower housing 21. Thereby, any looseness of the rack guide 31 in the guide hole 21a can be eliminated, such that noise due to vibration of the rack guide 31 can be prevented.

Figure 9:
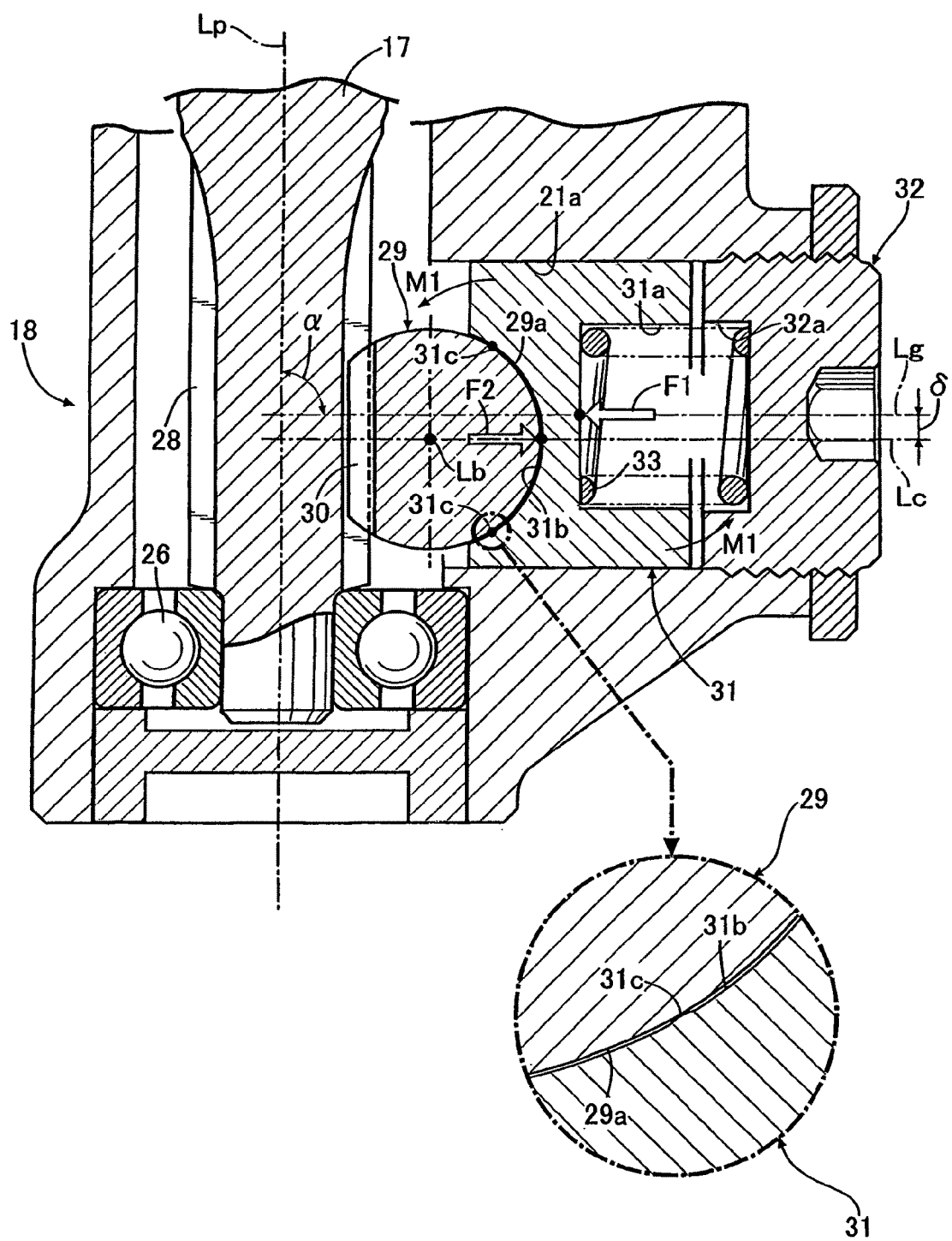
FIGS. 9 and 10 show a fourth exemplary embodiment according to the present invention.
Figure 10:
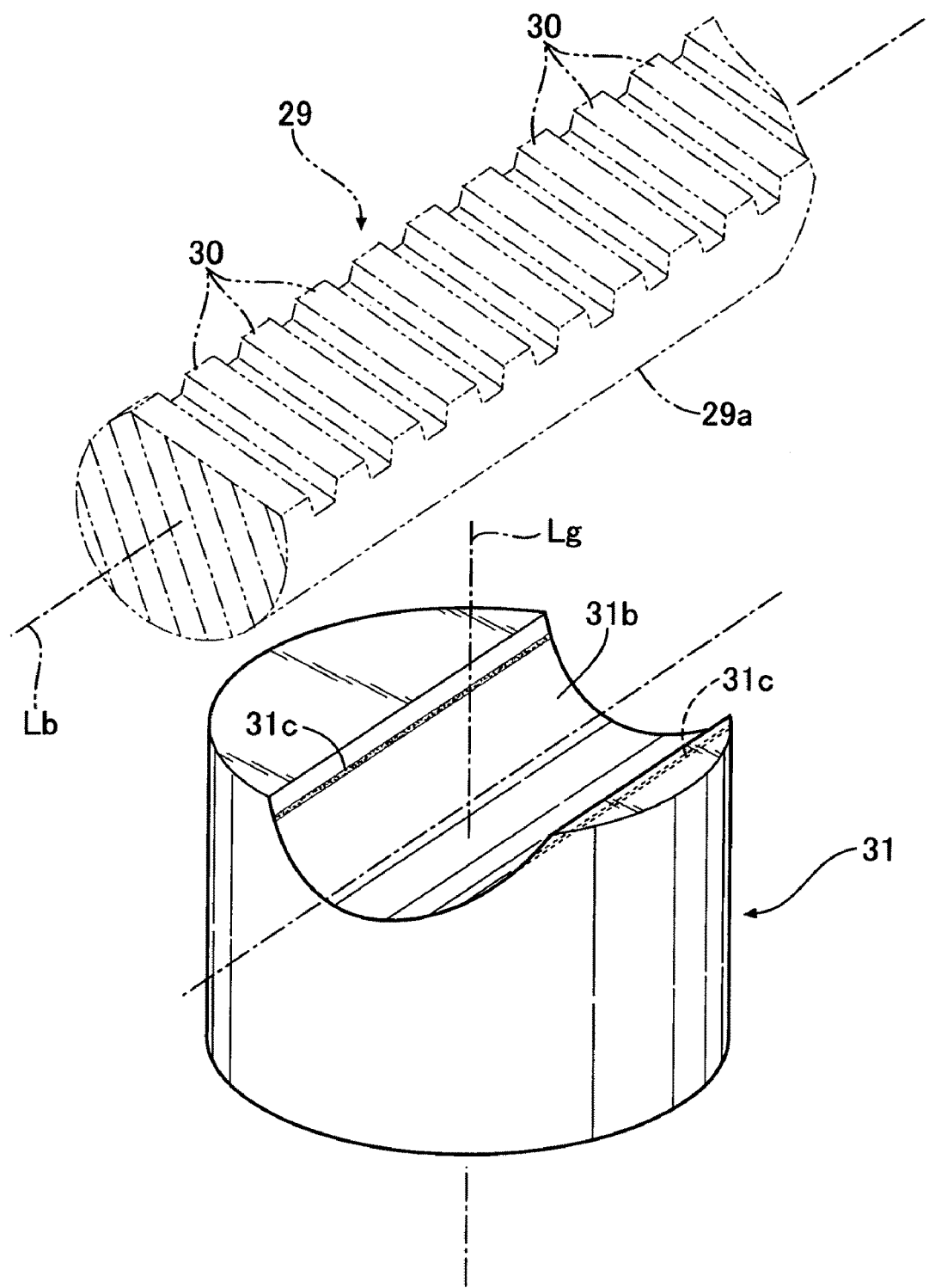

Next, a fourth exemplary embodiment of the present invention will be described with reference to FIGS. 9 and 10.

The fourth exemplary embodiment is a modification of the first exemplary embodiment. In the first embodiment, the rear part 29a of the rack bar 29 evenly abuts the pressure surface 31b of the rack guide 31. In the fourth embodiment, two low-ridge-shaped raised contact lines 31c, 31c extending in parallel with the axis Lb of the rack bar 29, are formed in respective upper and lower locations, which are vertically symmetrical, on the pressure surface 31b of the rack guide 31. As best seen in the inset portion of FIG. 9, these raised contact lines 31c, 31c are integrally formed on the rack guide 31 and abut on the rear part 29a of the rack bar 29. The raised, integrally formed contact lines 31c, 31c are also shown in FIG. 10 in parallel with the axis of the rack bar 29.

Figure 11:
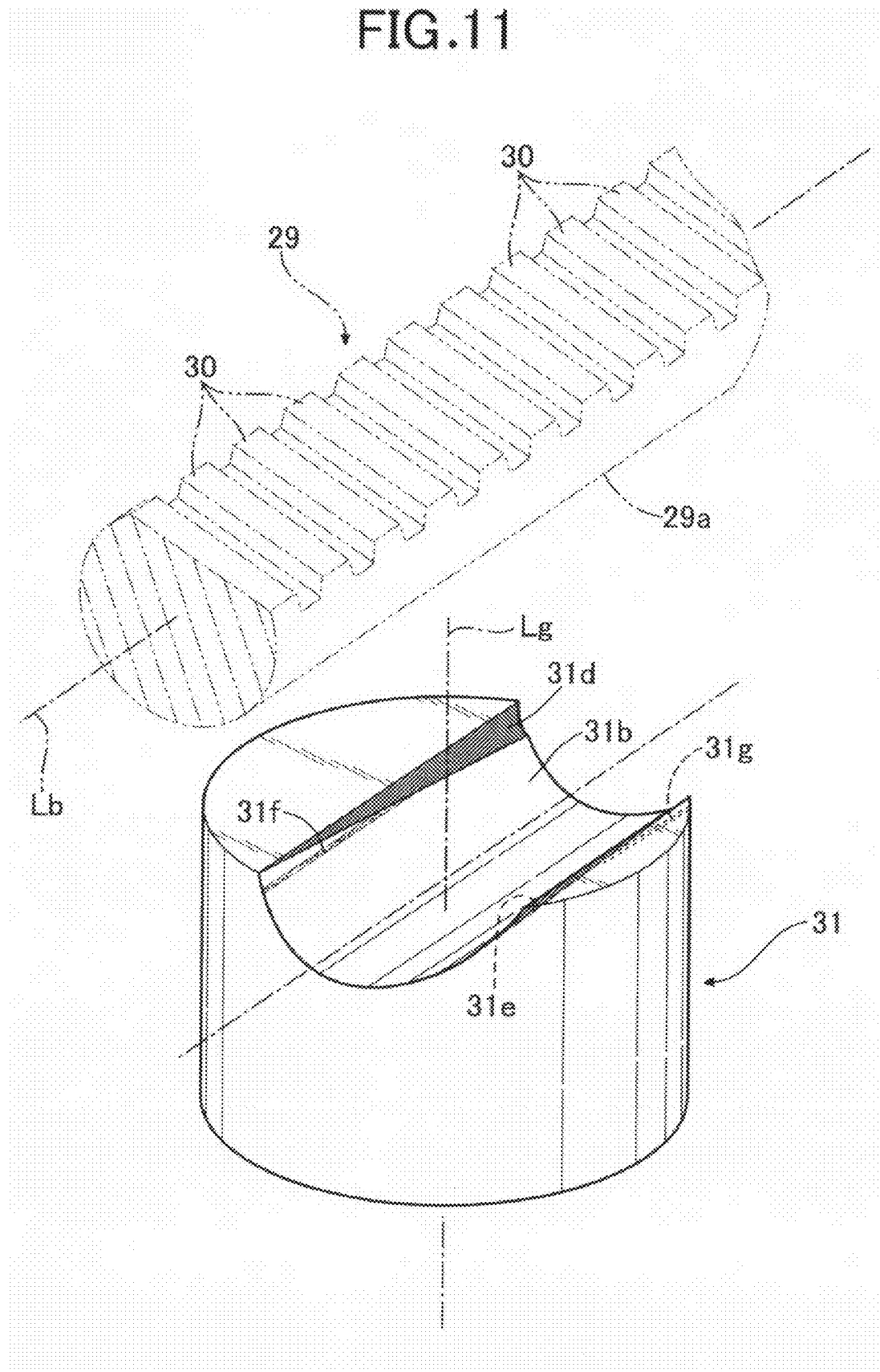
FIG. 11 is a perspective view of a rack guide and a rack bar according to a fifth exemplary embodiment of the present invention.
Figure 12:
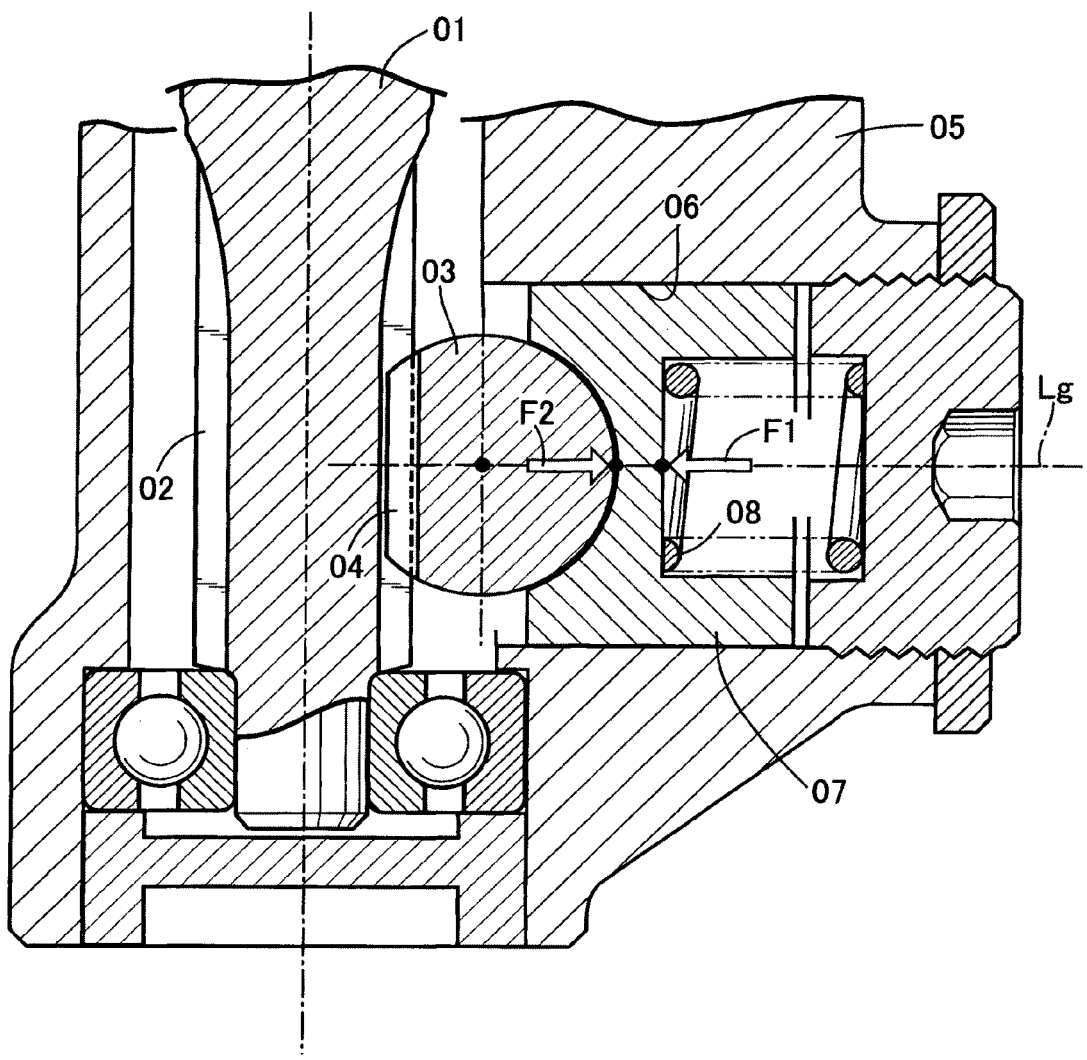
FIG. 12 is a view showing a conventional-type rack-and-pinion steering apparatus.

Next, a fifth exemplary embodiment of the present invention will be described with reference to FIG. 11.

The fifth exemplary embodiment is a modification of the second exemplary embodiment. In the second exemplary embodiment, the rear part 29a of the rack bar 29 evenly abuts the pressure surface 31b of the rack guide 31. In the fifth exemplary embodiment, a contact line 31f is formed along a narrower part of the upper notch 31d, and a contact line 31g is formed along a narrower part of the lower notch 31e. These contact lines 31f, 31g abut on the rear part 29a of the rack bar 29.

According to the fourth and fifth exemplary embodiments, the respective contact lines 31c, 31c and 31f, 31g provided on the pressure surface 31b of the rack guide 31 are caused to abut the rear part 29a of the rack bar 29. This configuration enables reduction in resistance which occurs when the rack bar 29 and the rack guide 31 slide on each other.

Note that the lower housing 21 of the exemplary embodiments disclosed herein corresponds to the housing of the present invention, and that the spring 33 of the exemplary embodiments corresponds to the spring member of the present invention.

The foregoing descriptions have been provided for the exemplary embodiments of the present invention. However, the present invention is not limited to the above embodiments. Various design modifications can be carried out without departing from the scope of the present invention as set forth in the appended claims.

For example, the present invention may be applied to a cable steering apparatus and a steer-by-wire steering apparatus, although a mechanically-connected shaft steering apparatus has been exemplified in the above embodiments. Further, the present invention may be applied not only to an electric steering apparatus having the assist motor M, but also to a manual steering apparatus having no assist motor M.

What is claimed is:

1. A rack-and-pinion steering apparatus in which a steering gear box for transmitting an operation of a steering wheel to road wheels includes: a pinion operatively connected to the steering wheel; a rack bar which has a rack meshing with the pinion, and which is operatively connected to the road wheels; a housing slidably supporting the rack bar; a cylindrical rack guide slidably fitted into a guide hole formed in the housing; and a spring member causing the rack guide to abut on a rear of the rack bar opposite to the rack by biasing the rack guide, wherein a reaction force which the rack guide receives from the rack bar acts on the rack guide in such a way as to cause a rotational moment of the rack guide about a first axis different from a second axis, wherein said second axis is an axis of the rack guide;

wherein the rack guide comprises a pressure surface having an arc-shaped cross-section and with which the rack guide presses the rear of the rack bar, the pressure surface having a first tapered notch formed in a first edge thereof and a second tapered notch formed in a second edge thereof, the first tapered notch having a first end with larger width and second end opposite the first end and having a smaller width, and the second tapered notch having a first end with larger width and second end opposite the first end and having a smaller width.

2. The rack-and-pinion steering apparatus according to claim 1, wherein a line of action of the reaction force is non parallel with the second axis of the rack guide, and is eccentric to the second axis of the rack guide.

3. The rack-and-pinion steering apparatus according to claim 2, wherein the reaction force causes a rotational moment which rotates the rack guide about the line of action of the reaction force.

4. The rack-and-pinion steering apparatus according to claim 1, wherein a line of action of the reaction force extends non-parallel with the axis of the rack guide.

5. The rack-and-pinion steering apparatus according to claim 4, wherein an angle between an axis of the pinion and the axis of the rack guide is other than a right angle.

6. The rack-and-pinion steering apparatus according to claim 1, wherein the rack guide presses the rear of the rack bar with a pressure surface of the rack guide, a plurality of raised, integrally formed contact lines extending in parallel with an axis of the rack bar protrude outwardly from the pressure surface, and wherein the contact lines abut the rear of the rack bar.

7. The rack-and-pinion steering apparatus according to claim 1, wherein said first axis is parallel to an axis of the rack bar.

8. A rack-and-pinion steering apparatus in which a steering gear box for transmitting an operation of a steering wheel to road wheels includes: a pinion operatively connected to the steering wheel; a rack bar which has a rack meshing with the pinion, and which is operatively connected to the road wheels; a housing slidably supporting the rack bar; a cylindrical rack guide slidably fitted into a guide hole formed in the housing; and a spring member causing the rack guide to abut on a rear of the rack bar opposite to the rack by biasing the rack guide, wherein the rack bar and the rack guide are structured and arranged relative to each other at an angle other than a 90 degree angle, so that the rack bar applies a reaction force to the rack guide which acts on the rack guide in such a way as to cause a rotational moment of the rack guide about a first axis different from a second axis, wherein said second axis is an axis of the rack guide;

and wherein the rack guide comprises a pressure surface having an arc-shaped cross-section and with which the rack guide presses the rear of the rack bar, the pressure surface having a first tapered notch formed in a first edge thereof and a second tapered notch formed in a second edge thereof, the first tapered notch having a first end with larger width and second end opposite the first end and having a smaller width, and the second tapered notch having a first end with larger width and second end opposite the first end and having a smaller width.

9. The rack-and-pinion steering apparatus according to claim 8, wherein a line of action of the reaction force is non-parallel with the axis of the rack guide, and is eccentric to the axis of the rack guide.

10. The rack-and-pinion steering apparatus according to claim 9, wherein the reaction force causes a rotational moment which rotates the rack guide about the line of action of the reaction force.

11. The rack-and-pinion steering apparatus according to claim 8, wherein a line of action of the reaction force extends non-parallel with the axis of the rack guide.

12. The rack-and-pinion steering apparatus according to claim 8, wherein the rack guide presses the rear of the rack bar with a pressure surface of the rack guide, a plurality of raised, integral contact lines extending in parallel with an axis of the rack bar protrude outwardly from the pressure surface, and wherein the contact lines abut the rear of the rack bar.

13. The rack-and-pinion steering apparatus according to claim 8, wherein the rack guide includes a concave pressure surface which engages the rear of the rack bar.

* * * * *